(12) United States Patent
Whittier et al.

(10) Patent No.: US 8,828,112 B2
(45) Date of Patent: Sep. 9, 2014

(54) AIR FILTER

(75) Inventors: William B. Whittier, Spotsylvania, VA (US); Mark Huebner, Fredericksburg, VA (US); Balika Bellore, Arlington, VA (US); Carl Pates, Spotsylvania, VA (US)

(73) Assignee: HDT Expeditionary Systems, Inc., Solon, OH (US)

( * ) Notice: Subject to any disclaimer, the term of this patent is extended or adjusted under 35 U.S.C. 154(b) by 335 days.

(21) Appl. No.: 13/225,773

(22) Filed: Sep. 6, 2011

(65) Prior Publication Data

US 2012/0055126 A1 Mar. 8, 2012

Related U.S. Application Data

(60) Provisional application No. 61/380,364, filed on Sep. 7, 2010.

(51) Int. Cl.
*B01D 46/00* (2006.01)
*B01D 53/04* (2006.01)
*B01D 46/52* (2006.01)
*B01D 46/24* (2006.01)

(52) U.S. Cl.
CPC ........ *B01D 46/2411* (2013.01); *B01D 53/0431* (2013.01); *B01D 2101/02* (2013.01); *B01D 46/521* (2013.01); *B01D 53/0415* (2013.01); *B01D 2267/40* (2013.01); *B01D 2253/102* (2013.01); *B01D 46/0036* (2013.01); *B01D 46/0024* (2013.01); *B01D 46/2414* (2013.01)
USPC .................. 55/482; 55/318; 55/498; 55/510; 55/517; 96/135; 96/137; 96/138

(58) Field of Classification Search
CPC ........... B01D 46/0024; B01D 46/0036; B01D 46/0038; B01D 46/2411; B01D 53/0415; B01D 53/0431; B01D 2101/02; B01D 2253/102; B01D 2267/40
USPC ........... 55/318, 476, 482, 486, 498, 510, 517; 96/135, 137, 138
See application file for complete search history.

(56) References Cited

U.S. PATENT DOCUMENTS

| 3,494,114 | A | * | 2/1970 | Nelson et al. | 55/482 |
|---|---|---|---|---|---|
| 3,733,267 | A | * | 5/1973 | Haase | 10/669 |
| 4,322,230 | A | | 3/1982 | Schoen et al. | |
| 4,559,066 | A | * | 12/1985 | Hunter et al. | 96/117.5 |
| 4,838,901 | A | * | 6/1989 | Schmidt et al. | 95/90 |
| 4,865,637 | A | | 9/1989 | Gruber | |
| 4,878,929 | A | * | 11/1989 | Tofsland et al. | 55/486 |
| 6,152,996 | A | * | 11/2000 | Linnersten et al. | 96/135 |
| 6,641,637 | B2 | | 11/2003 | Kallsen et al. | |
| 7,122,258 | B2 | * | 10/2006 | Traver | 429/410 |
| RE41,713 | E | | 9/2010 | Gunderson et al. | |
| 2011/0219768 | A1 | * | 9/2011 | Namimatsu et al. | 60/602 |
| 2011/0311400 | A1 | * | 12/2011 | Billingsley et al. | 422/120 |

* cited by examiner

*Primary Examiner* — Robert Clemente
(74) *Attorney, Agent, or Firm* — Fay Sharpe LLP (57) ABSTRACT

A gas-particulate filter canister includes a filter canister body and first and second canister end caps secured to opposing ends of the filter canister body. First and second filter cartridges are supported within the filter canister body for filtering a gas in series. The filter cartridges can be standalone units which are built independently and are installed into the filter canister body. The filter cartridges can be concentrically arranged and can include a particulate filter cartridge and a gas filter cartridge.

20 Claims, 9 Drawing Sheets

AIR FILTER

This application claims priority to and the benefit of the filing date of U.S. Provisional Application No. 61/380,364, filed Sep. 7, 2010, which application is herein incorporated by reference in its entirety.

BACKGROUND

The disclosure pertains to a filter canister which treats contaminated air passing therethrough. However, it will be appreciated by those skilled in the art that the disclosure has broader applications and may be useful also in various other fluid filtering environments.

Air handling systems now frequently include filtration systems that can protect an enclosure against noxious airborne agents released in the vicinity of the enclosure. Such agents include nuclear, biological or chemical agents (known as NBC). Charcoal filters as well as paper filters (which can be provided in series with charcoal filters) are typically used in breathing apparatus for fire fighters, miners, soldiers in the field, and in many different types of industrial environments. Certain of these filter elements or cartridges are utilized in a breathing device or respirator unit which incorporates a fan for drawing or pushing air through the filter element.

Another environment utilizing filter cartridges, housed in a large assembly including a fan, is a survival shelter adapted for use as a place of refuge during warfare, industrial accidents, earthquakes, terrorism, sabotage, and the like. Such conventional shelters are provided with various filtration devices for filtering the air of the environment such as the so-called "NBC", (nuclear, biological, chemical) filtration devices. These devices generally house a filtration cartridge, which may be an activated charcoal cartridge or the like, for filtering the air which is allowed to enter the shelter. Further, certain emergency and/or military vehicles may utilize such filters to filter air prior to circulation through a cabin of the vehicle.

In any of these environments, problems are encountered when the filter cartridges leak so that unfiltered air is allowed bypass the filter element(s). Such unfiltered air can be very hazardous to the health of those individuals breathing the air meant to be cleaned by the filtration device. Similarly, in an environment where the filter cartridge is meant to do some type of industrial filtration, any fluid (air or liquid) left unfiltered would defeat the purpose of the filtration assembly and would be similarly disadvantageous, even if it would not be hazardous to health.

Conventional filter constructions have typically included a cylindrical outer housing and a pair of end caps enclosing each end of the cylindrical outer housing. The end caps are often machined with various annular recesses on their axially inner sides for receiving a particulate filter element and a gas filter element. These are assembled within the outer housing and trapped between the end caps. Such filter elements typically share sleeves or other layers within the filter, which can make identifying issues or problems with the filter a challenge since the individual filter elements cannot readily be tested separate from each other. Moreover, since the filter elements are assembled within the outer housing, conventional filter constructions generally do not permit observation of the assembly of joints and/or interfaces within the filter that can impact filter performance. In many applications, and in particular when such filters are intended to filter air for breathing, maximizing filter construction quality and performance is desirable.

BRIEF SUMMARY

According to one embodiment of the present disclosure, a gas-particulate filter canister is provided. The filter canister comprises a filter canister body and first and second canister end caps secured to opposing ends of the filter canister body. First and second filter cartridges are supported within the filter canister body for filtering a gas in series. Each of the first and second filter cartridges have a filter element supported between respective cartridge end caps, and at least one of the first or second filter cartridges is removable as a unit from the filter canister body.

According to another embodiment of the present disclosure, a method for making a gas particulate filter canister for filtering a gas is provided. The method comprises providing a first filter cartridge including filter media supported between a first set of end caps and providing a second filter cartridge including a filter media supported between a second set of end caps. The first and second filter cartridges are inserted into the filter canister body. Inlet and outlet end caps are secured to respective ends of the canister body with the first and second filter cartridges trapped therebetween.

According to still another embodiment of the present disclosure, a gas filtration assembly is provided. The gas filtration assembly comprises a canister including a hollow interior and open first and second ends. An inlet end cap is secured to the first end of the canister, the inlet end cap including a first aperture. An outlet end cap is secured to the second end of the canister, the outlet end cap including a second aperture. First and second annular filter cartridges are concentrically arranged within the hollow interior of the canister. Each filter cartridge includes porous side walls and non-porous end walls. A gas to be filtered flows axially into the canister through the first aperture radially through the first and second filter cartridges and axially out through the second aperture.

DETAILED DESCRIPTION

Figures 1, 2:
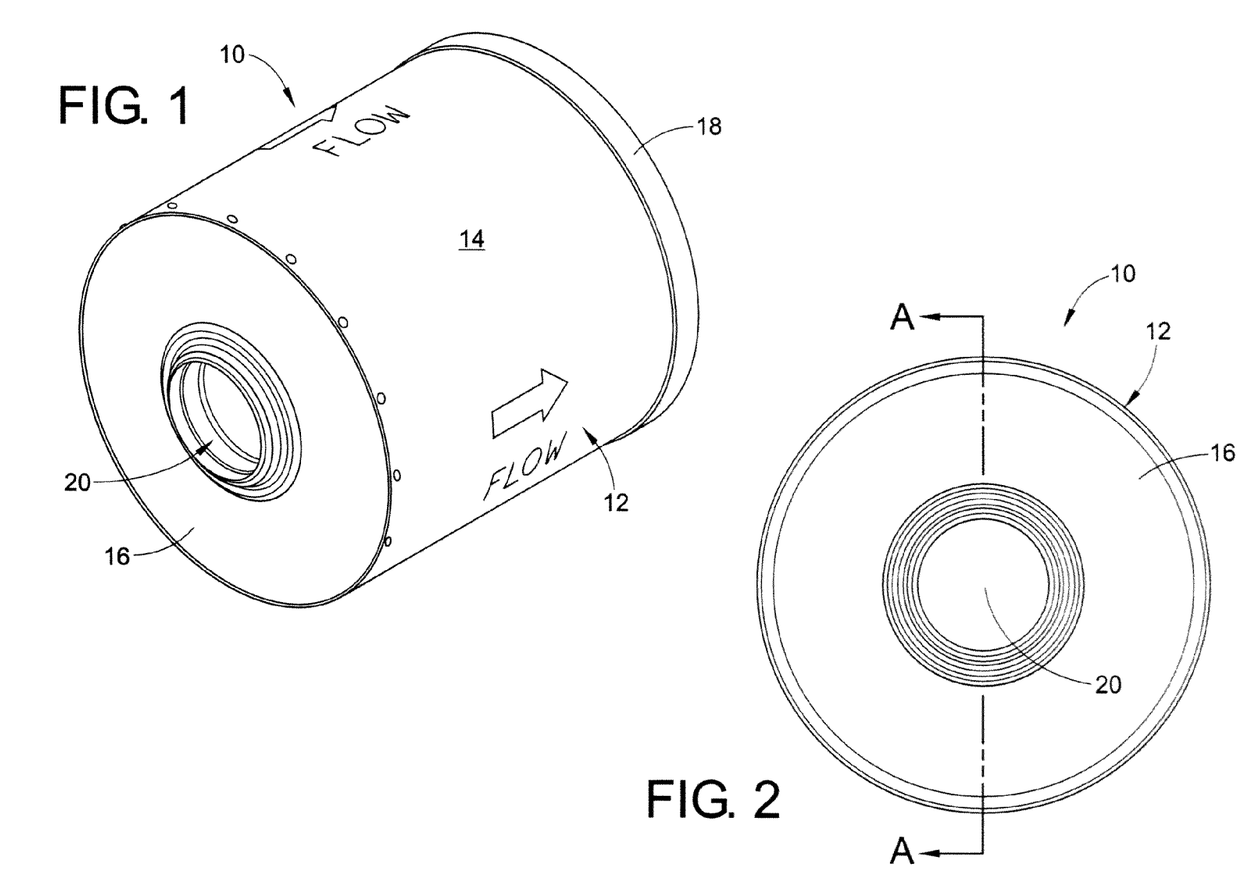
FIG. 1 is a perspective view of an exemplary filter canister according to one embodiment of the present disclosure.
FIG. 2 is an end elevational view of the exemplary filter canister of FIG. 1.

With reference to FIGS. 1 and 2, an exemplary embodiment of a filter canister 10 according to the present disclosure includes a cylindrical filter canister body 12 comprising an outer wall or side wall 14 which is disposed between an inlet end cap 16 and an outlet end cap 18. The inlet end cap 16 includes a central inlet opening 20 for receiving a fluid such as a gas (e.g., air) to be filtered, while the outlet end cap 18 includes central outlet opening 22 (see FIG. 3) for discharging filtered gas from the filter canister 10. The filter canister body 12, including the outer wall 14 and end caps 18 and 20, can generally be made of metal, although plastic or other composite materials may be suitable for some applications. Supported within the filter canister 10 is a pair of filter cartridges for filtering gas as it flows via the inlet opening 20 through the filter cartridges to the outlet opening 22.

Figure 3:
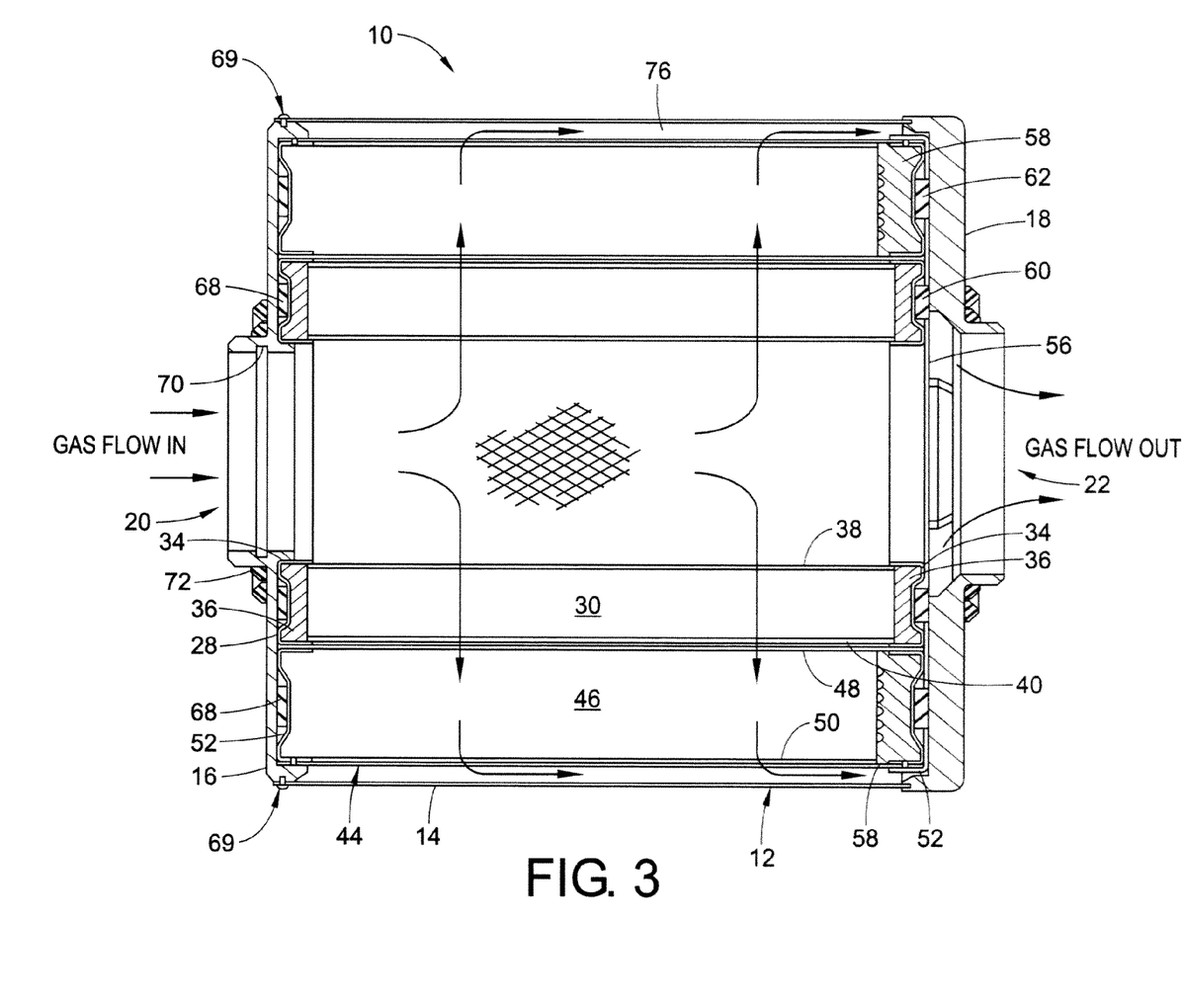
FIG. 3 is an enlarged cross-sectional view taken along the line A-A in FIG. 2.

Turning to FIG. 3, which is a cross-sectional view taken through the filter canister 10 along the line A-A in FIG. 2, the details of the filter canister 10 are illustrated. The filter canister 10 generally includes concentrically arranged inner and outer filter cartridges or assemblies adapted to filter incoming gas in series. The inner and outer filter cartridges are stand alone assemblies that are independently assembled and then integrated into the filter canister 10.

Figure 4:
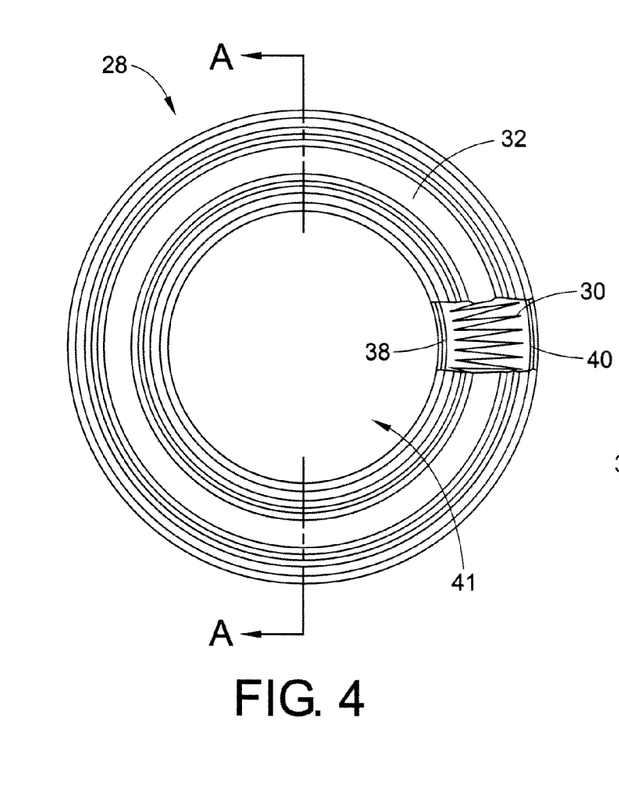
FIG. 4 is cutaway plan view of an exemplary particulate filter cartridge according to the disclosure which can be housed in the filter canister of FIG. 1.
Figure 5:
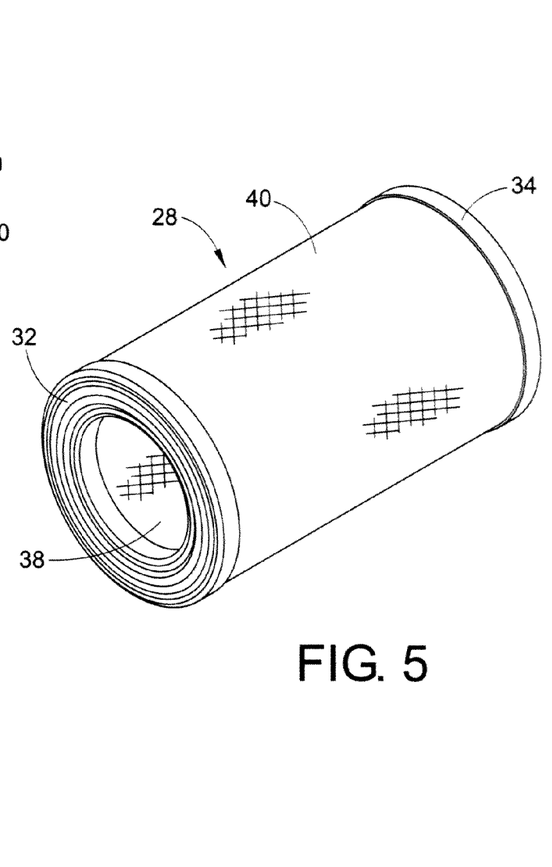
FIG. 5 is a reduced perspective view of the particulate filter cartridge of FIG. 4.

With additional reference to FIGS. 4 and 5, the inner filter cartridge can be a particulate filter cartridge 28 generally including a pleated fiber filter element 30. In one embodiment, a paper HEPA filter element for example, can be secured between opposing end caps 32 and 34. The pleated fiber filter element 30 can be secured to the end caps 32 and 34 with a suitable potting compound 36 as shown, or via other suitable methods. Protective inner and outer liners 38 and 40 surround the radially inner and outer circumferences of the fiber filter element 30. The inner and outer liners 38 and 40 can also be secured to the end caps via potting compound 36.

The particulate filter cartridge 28 has a central opening 41 adapted to mate with central intake opening 20 of intake end cap 16 of the filter canister 10. Air received via the central intake opening 20 of the filter canister 10 flows into the central opening 41 of the particulate filter cartridge 28 and exits radially outwardly to the exterior of cartridge 28 through the outer protective liner 40 to the outer filter element. Particulate matter is filtered from the air as it passes through the filter element 30.

Figure 6:
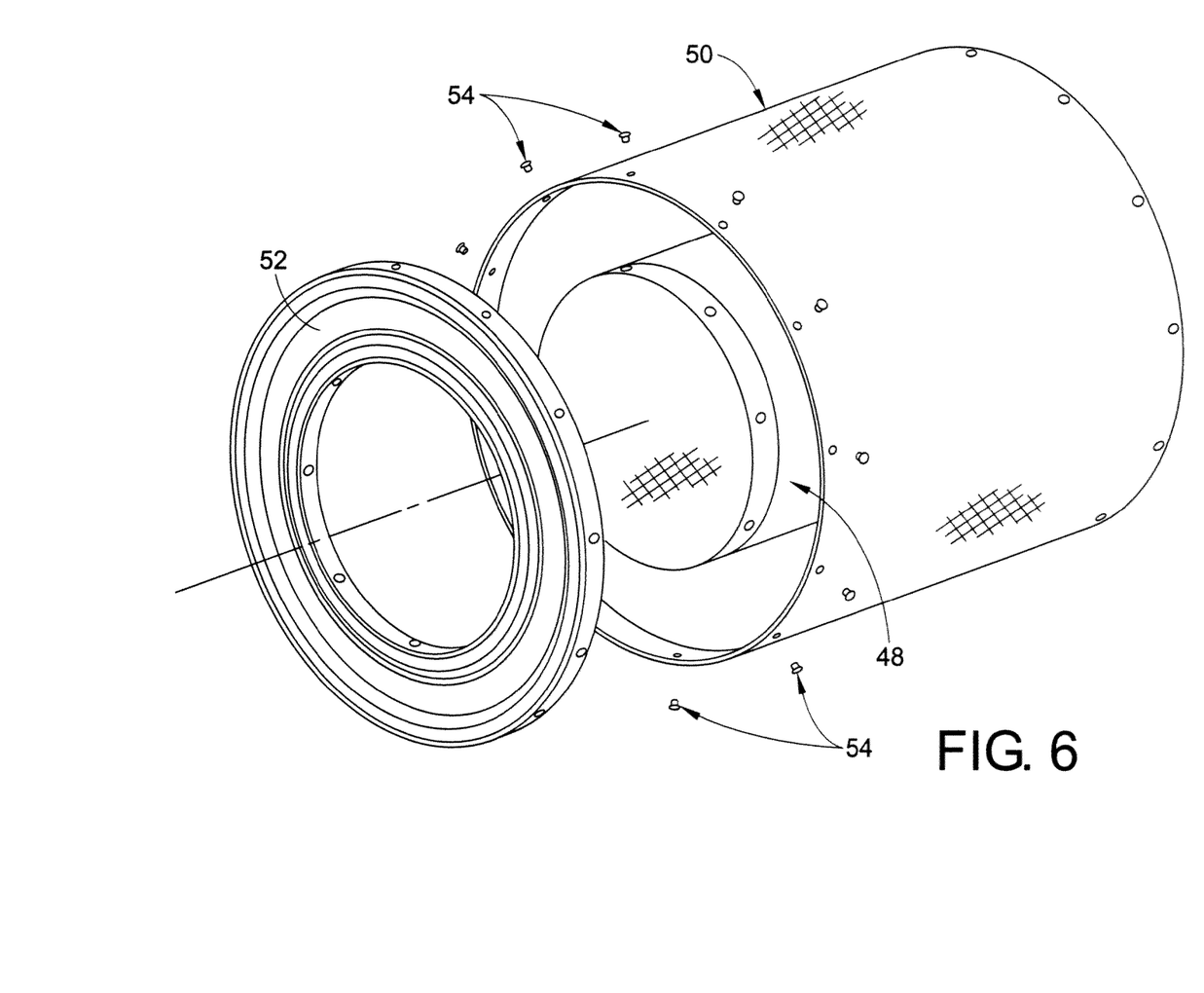
FIG. 6 is an exploded perspective view of an exemplary gas filter cartridge in accordance with the disclosure which can be housed in the filter cartridge of FIG. 1.

Returning to FIG. 3, and with additional reference to FIG. 6, the outer filter element can be a gas filter cartridge 44 generally including a carbon filter media 46 disposed between radially inner and outer gas liners 48 and 50. The radially inner and outer gas liners 48 and 50 are secured to end caps 52 with a plurality of rivets 54 or other fasteners. Other fastening methods can also be employed, as will be appreciated.

Figure 7:
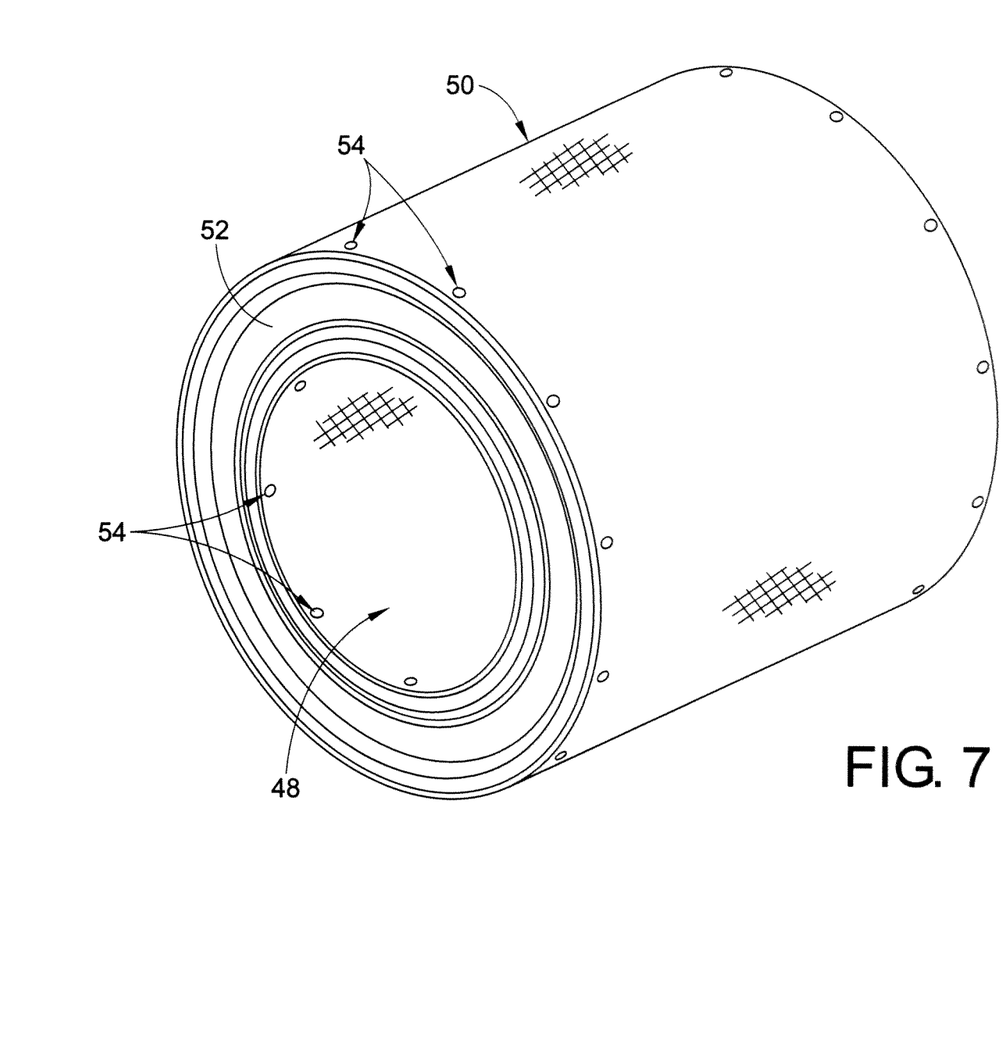
FIG. 7 is an assembled perspective view of the gas filter cartridge of FIG. 6 on a reduced scale.

In constructing the gas filter cartridge 44, after a first end cap is secured to the inner and outer liners 48 and 50, the annular space between the liners is filled with a pelletized or granular filter medium 46, such as granulated charcoal or the like. With further reference to FIG. 7, once the gas filter media 46 is installed, a compression pad 58 (see FIG. 3) is disposed within the annular space and the other end cap 52 is then riveted with rivets 54 to the inner and outer liners 48 and 50 the gas filter cartridge 44. Other fasteners can be used to secure the end caps to the liners as well. In addition, adhesive and/or sealant can be used to seal each joint of the gas filter cartridge 44.

Returning to FIG. 3, the particulate filter cartridge 28 and the gas filter cartridge 44 are supported within the filter canister 10 by a common end cap 56. The common end cap 56 is generally cylindrical and has an axially extending outer circumferential side wall 58 that is telescoped over a radially outer side wall of an end cap of the gas filter assembly 44. The diameter of the common end cap 56 is sized to closely receive the gas filter cartridge 44, along with the particulate filter cartridge 28 in the concentric arrangement as shown. Respective sealing gaskets 60 and 62 seal the respective axial ends of the particulate filter cartridge 28 and the gas filter cartridge 44 to the common end cap 56.

At the inlet end of the filter cartridge 10, the particulate filter cartridge 28 and gas filter cartridge 44 are received in an annular recess in the axially-inner face of the inlet end cap 16. Gaskets 68 are provided for sealing the axial ends of the cartridges to the inlet end cap 16. As noted previously, the inlet end cap 16 and outlet end cap 18 are each secured to respective ends of the outer housing 12, with the particulate filter cartridge 28 and gas filter cartridge 44 trapped therebetween. In the illustrated embodiment, the inlet end cap is riveted with rivets 69 to the outer housing 12, while the outlet end cap 18 is bonded or otherwise connected to the outer housing 12. As will be appreciated, adhesive and/or sealant can be used to reinforce and/or seal any joint or interface of the filter canister 10, as desired.

In use, the filter cartridge 10 is connected via central inlet opening 20 to a source of air to be filtered. This can be an air intake open to the environment, for example. Respective inner and outer seals 70 and 72 are provided for sealing the connection between the air intake and the inlet end cap 16. Air flowing into the air filter canister 10 via the central intake opening 20 first flows into the interior of the particulate filter cartridge 28. Particulate matter is removed from the air as it passes radially outwardly through the filter element 30 of the particulate filter cartridge 28. Air exiting the particulate filter cartridge then flows radially outwardly through the gas filter cartridge 44. The carbon media of the gas filter cartridge will remove various biological and/or chemical contaminants from the air being filtered.

Figure 8:
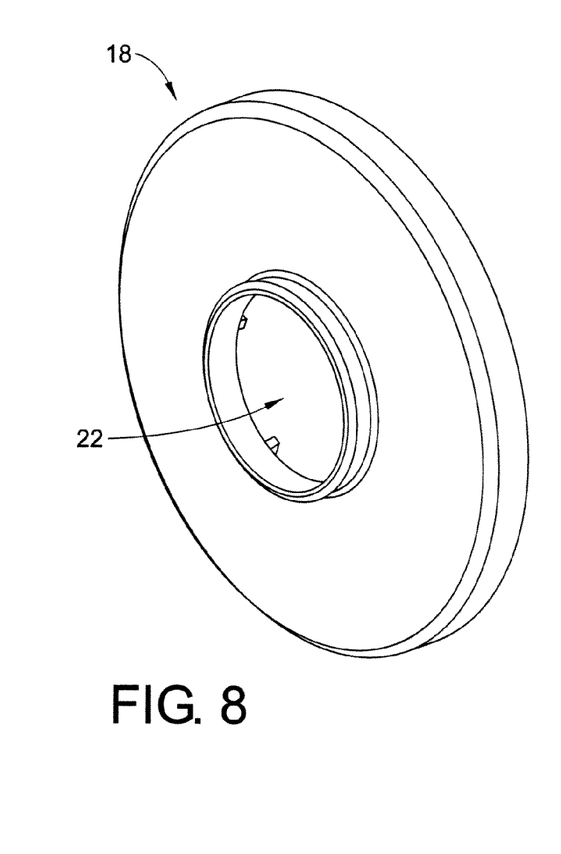
FIG. 8 is a perspective view of an axially outer side of an end cap of the canister assembly of FIGS. 1-3.
Figure 9:
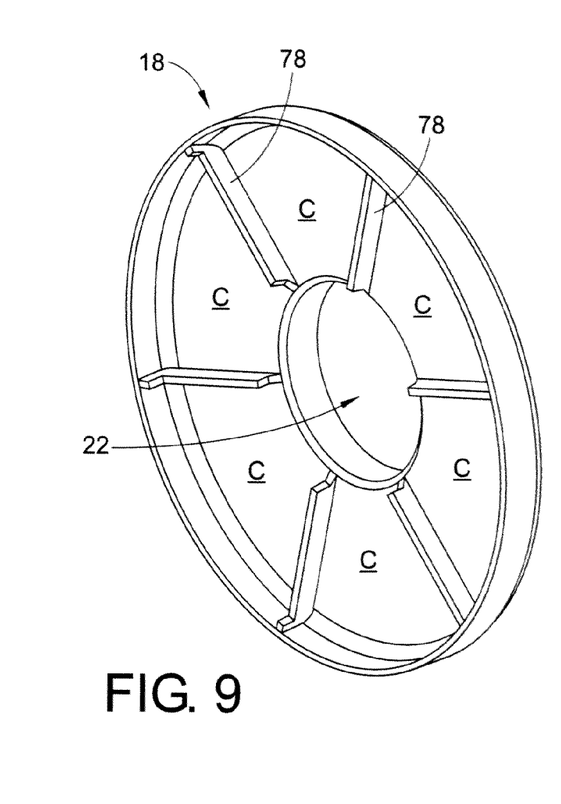
FIG. 9 is a perspective view of an axially inner side of an end cap of the canister assembly of FIGS. 1-3.

The now filtered air exiting radially outwardly from the gas filter cartridge 44 is received in an annular space 76 formed between the gas filter cartridge 44 and the outer housing 12, which opens to the outlet end cap 18. As shown in FIGS. 8 and 9, the outlet end cap 18 includes a plurality of channels C that direct the filtered air from the annular space 76 to the filtered gas outlet opening 22. The channels C are formed between adjacent radially extending vanes 78 on the axially inner side of the outlet end cap 18. When assembled, vanes 78 abut the axially outer side of the common end cap 56 to form a plurality of passageways for directing the filtered air from the annular space 76 to the outlet opening 22. The flow path of the fluid through the filter canister 10 is indicated by the arrows in FIG. 3.

Figure 10:
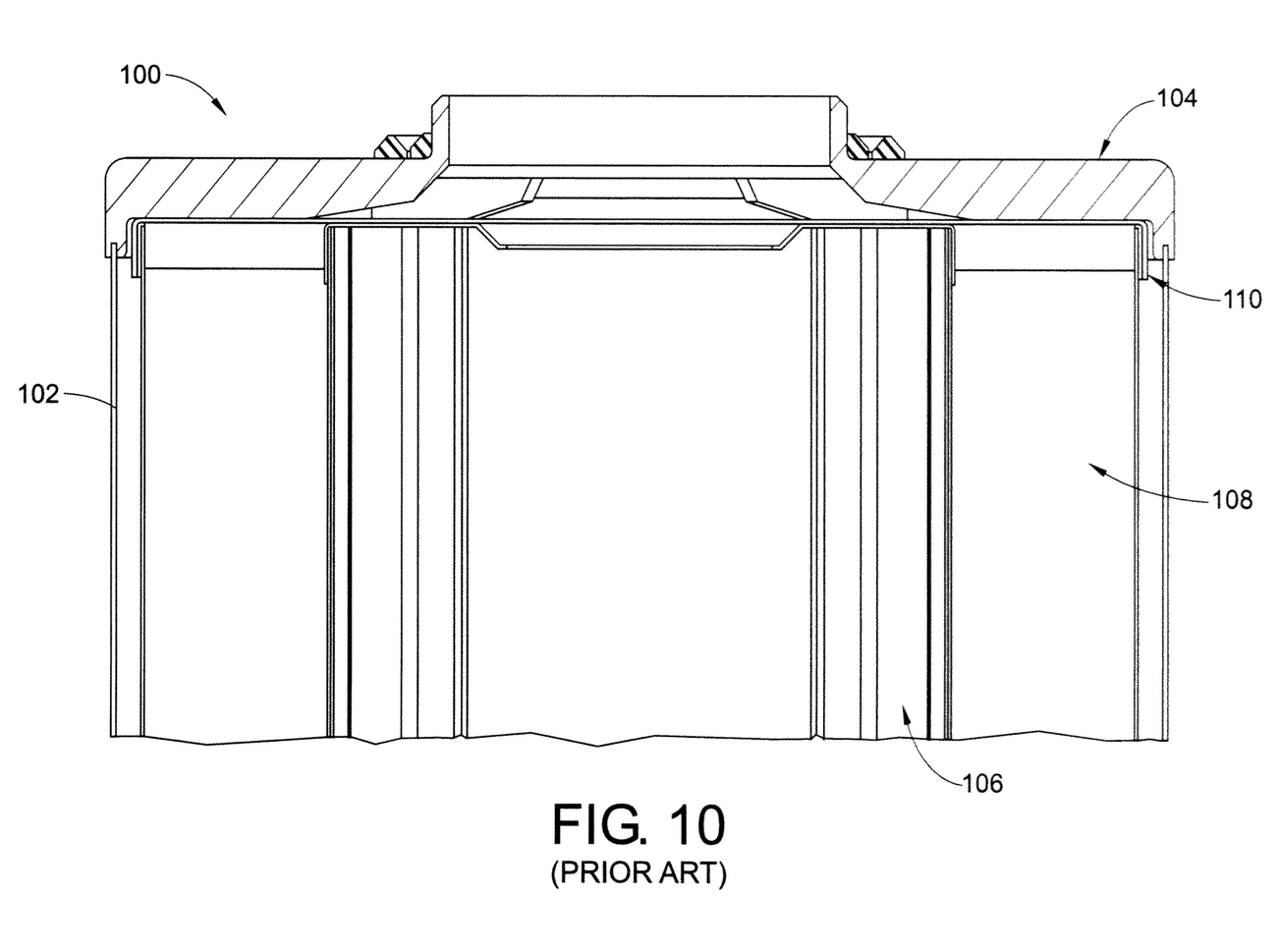
FIG. 10 is a cross-sectional view of a prior art filter canister.

Referring to FIG. 10, a prior art filter canister is illustrated and generally identified by reference numeral 100. The filter canister 100 includes an outer side wall 102 and a filter outlet casting 104 secured to the outer side wall 102. Housed within the outer side wall 102 is a particulate filter element 106 and a gas filter element 108. The particulate filter element 106 and gas filter element 108 are each secured to an end cap 110 that is supported within the filter outlet casting 104. This filter canister is representative of a prior art design wherein the particulate and gas filter elements are assembled within the cartridge and share common components.

As will now be appreciated, the filter canister 10 of FIGS. 1-9 includes a particulate filter cartridge and a gas filter cartridge that are themselves separate, complete units installed as such into the filter 10 canister. Unlike past filter designs wherein the respective particulate and gas filter elements are built together in a housing and share common end caps, liners, etc., by integrating separate complete filter cartridges into the filter canister 10, the present disclosure allows such filter cartridges to be tested independently prior to canister assembly. Independent testing of the filter cartridges can make it easier to identify any problems and/or easier to trace the source of any detected problems. As a result, a defective gas filter cartridge can be replaced without the need for replacing both filter elements held in a common housing.

Integrating separate filter cartridges in accordance with the present disclosure also facilitates simplification of the design of the filter canister inlet and outlet end caps 16 and 20. This can reduce the amount of machining required to produce the end caps and, in some instances, permit the end caps to be fabricated with a die casting process, thus reducing costs.

Moreover, the construction of the gas cartridge 44 as separate unit permits the compression pad to be observed during closing of the gas cartridge 44. As will be appreciated, the compression pad is installed over the filter media and is designed to be compressed between the filter media and the end cap of the gas filter cartridge such that it expands as the filter media settles to hold it in place. Prior designs involve fastening together the gas filter component in a process where the compression pad and filter top are hidden from view making detection of problems affecting filter performance more difficult.

It will also be appreciated that providing separate filter cartridges in accordance with the present disclosure can provide additional stiffness to the filter canister 10. This can potentially result in increased durability especially when used in environments where impact to the filter canister are possible.

Figure 11:
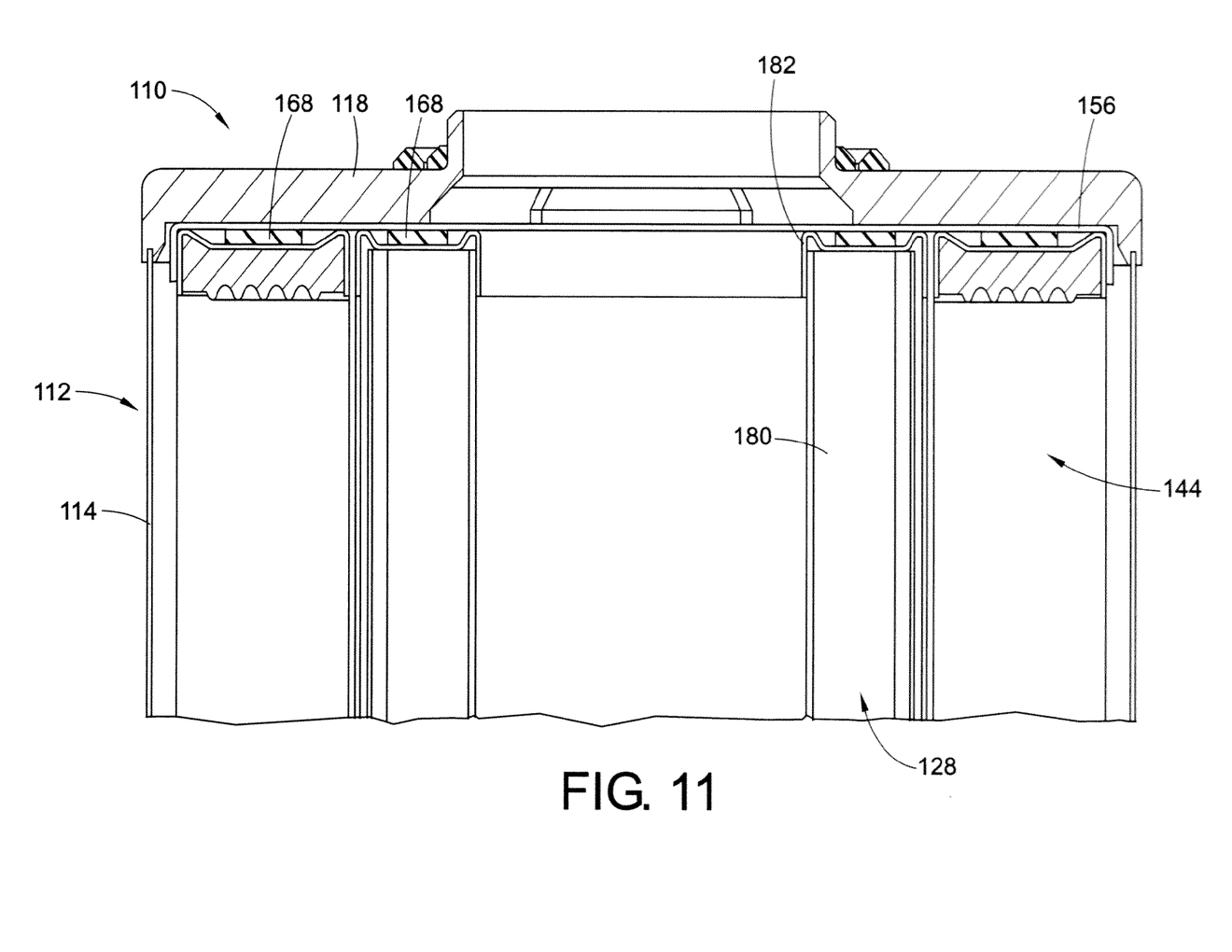
FIG. 11 is a cross-sectional view of a filter canister according to another embodiment of the present disclosure.
Figure 12:
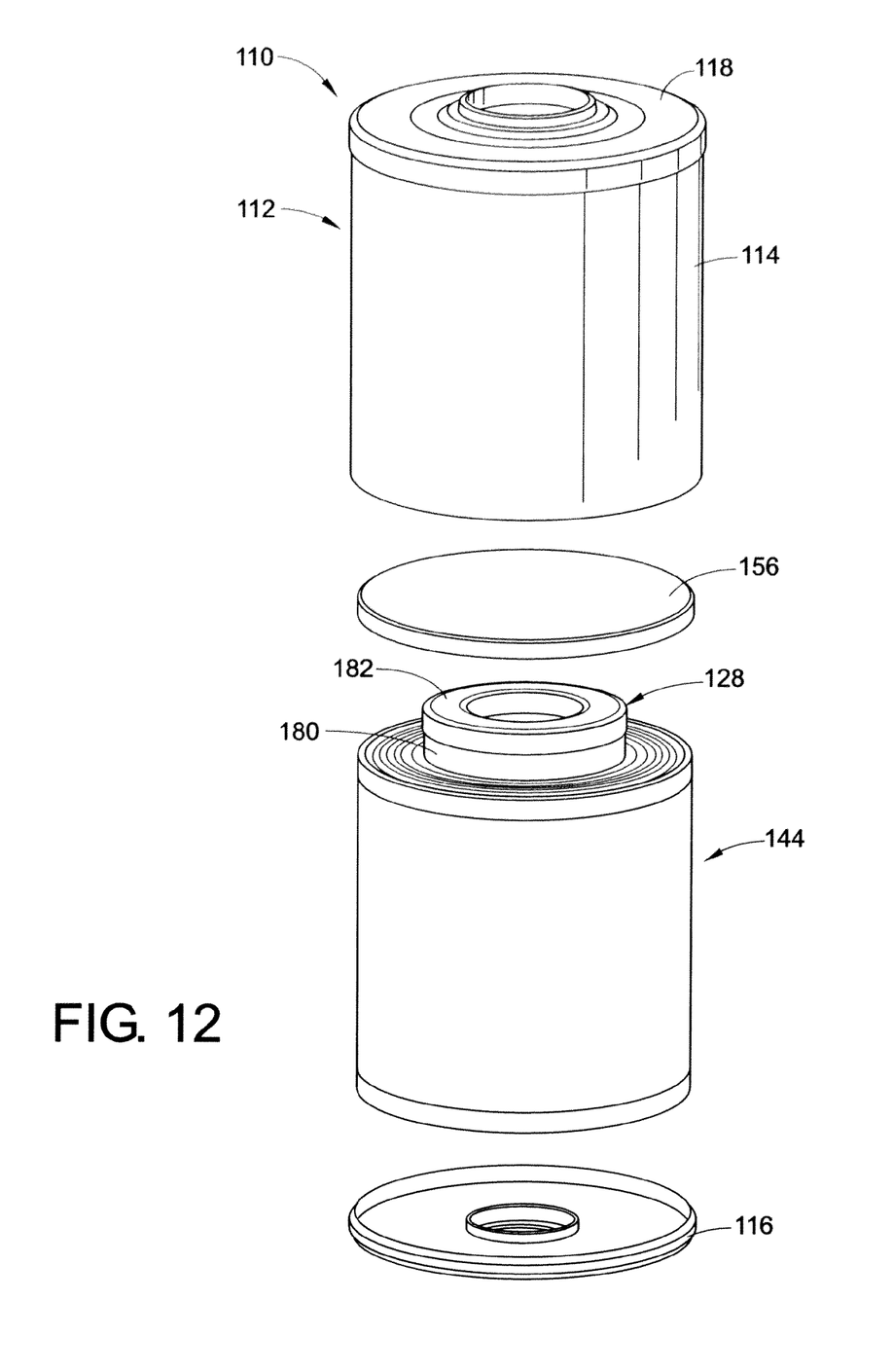
FIG. 12 is an exploded view of the filter canister of FIG. 11 on a reduced scale.

In FIGS. 11 and 12, another exemplary embodiment of a filter canister 110 in accordance with the disclosure is illustrated. With the exception of the construction of the particulate filter cartridge, the filter canister 110 includes similar components as the filter canister 10 of FIGS. 1-9. Accordingly, the filter canister 110 includes, inter alia, a canister body 112 comprising an outer side wall 114 disposed between an inlet end cap 116 and an outlet end cap 118. Supported within the canister body 112 between the inlet and outlet end caps 116 and 118 are a particulate filter cartridge 128 and a gas filter cartridge 144. A common end cap 156 supports the filter cartridges 128 and 144 within the canister 110. Gaskets 168 are provided for sealing the axial ends of the filter cartridges 128 and 144 to the common end cap 156.

In the embodiment of FIGS. 11 and 12 the particulate filter cartridge 128 includes a filter element 180 secured at each axial end to a particulate filter cartridge end cap 182 without potting compound. For example, the filter element 180 may be glued and/or crimped to the cartridge end cap 182. As will be appreciated, the description of the components and construction of the filter canister 10 are equally relevant to the filter canister 110. Thus, further details of the construction of filter canister 110 will be not be included but will be understood with reference to the preceding description of filter canister 10.

Disclosed has been a filter canister which comprises a first filter cartridge and a second filter cartridge adapted to filter a gas such as air in series. The first and second filter cartridges are standalone units that are integrated into a canister housing including a side wall and a pair of end caps. The filter cartridges are built independently thus allowing each to be tested independently prior to integration into the filter canister.

Accordingly, a gas-particulate filter canister comprises a filter canister body, first and second canister end caps secured to opposing ends of the filter canister body, and first and second filter cartridges supported within the filter canister body for filtering a gas in series. The first filter cartridge can include a particulate filter cartridge. The second filter cartridge can include a gas filter cartridge. The first and second filter cartridges can be concentrically arranged with the first filter cartridge at least partially surrounded by the second filter cartridge, and The fluid meant to be filtered, such as a gas, can flow through the first filter cartridge and then through the second filter cartridge. The first and second filter cartridges can be supported at common axial ends within the canister body by a common end cap that includes an axially extending side wall telescoped over a radially outer wall of one of the filter cartridges. Each of the first and second filter cartridges can include a respective pair of cartridge end caps. At least one of the canister end caps can be formed by a casting process. The first and second filter cartridges can be constructed as independent units. The first filter cartridge can include a pleated paper filter element. The second filter cartridge can include a carbon filter media. The filter canister body can be generally cylindrical, and the first and second filter cartridges can be cylindrical and concentrically arranged within the filter canister body. One of the end caps can include a filtered gas outlet and at least one channel on an axially inner side thereof for directing filtered gas towards the filtered gas outlet. At least one of the first and second filter cartridges can have an annular shape including a radially outer wall and a radially inner wall, and a mass of filtration material being disposed therebetween.

According to another aspect, a method of making a gas-particulate filter canister for filtering a gas comprises the steps of providing a first filter cartridge including filter media element supported between a first set of end caps, providing a second filter cartridge including filter media supported between a second set of end caps, inserting the first and second filter cartridges into a filter canister body, and securing inlet and outlet end caps to respective ends of the canister body with the first and second filter cartridges trapped therebetween. The method can further include the step of supporting the first and second filter canisters with a common end cap prior to the inserting step.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art and these are also intended to be encompassed by the following claims.

The invention claimed is:

1. A gas-particulate filter canister comprising:
    a filter canister body;
    first and second canister end caps secured to opposing ends of the filter canister body; and
    first and second filter cartridges supported within the filter canister body for filtering a gas in series, each of the first and second filter cartridges having a filter element supported between respective cartridge end caps;
    wherein at least one of the first or second filter cartridges is removable as a unit from the filter canister body;
    wherein the first and second filter cartridges are supported at common axial ends within the canister body by a common end cap that includes an axially extending side wall telescoped over a radially outer wall of one of the filter cartridges.

2. A filter canister as set forth in claim 1, wherein the first filter cartridge comprises a particulate filter cartridge.

3. A filter canister as set forth in claim 2, wherein the second filter cartridge comprises a gas filter cartridge.

4. A filter canister as set forth in claim 1, wherein the first and second filter cartridges are concentrically arranged with the first filter cartridge at least partially surrounded by the second filter cartridge, and gas is configured to flow through the first filter cartridge and then through the second filter cartridge.

5. A filter canister as set forth in claim 1, wherein the filter cartridge end caps are secured between the canister end caps.

6. A filter canister as set forth in claim 1, wherein at least one of the canister end caps is formed by a casting process.

7. A filter canister as set forth in claim 1, wherein the first and second filter cartridges are constructed as independent units.

8. A filter canister as set forth in claim 1, wherein the first filter cartridge includes a pleated paper filter element.

9. A filter canister as set forth in claim 1, wherein the second filter cartridge includes a carbon filter media.

10. A filter canister as set forth in claim 1, wherein the filter canister body is generally cylindrical, and the first and second filter cartridges are cylindrical and concentrically arranged within the filter canister body.

11. A filter canister as set forth in claim 1, wherein one of the canister end caps includes a filtered gas outlet and at least one channel on an axially inner side thereof for directing filtered gas towards the filtered gas outlet.

12. A filter canister as set forth in claim 1, wherein at least one of the first and second filter cartridges has an annular shape including a radially outer wall and a radially inner wall, and a mass of filtration material disposed therebetween.

13. A filter canister as set forth in claim 1, wherein an annular axially extending flow passage is defined adjacent an inner side wall of the filter canister body through which a gas that has passed through the first and second filters can flow.

14. A filter canister set forth in claim 1, wherein said common end cap prevents an axial flow of gas through a hollow interior of at least one of the first and second filter cartridges.

15. A gas-particulate filter canister comprising:
a filter canister body;
first and second canister end caps secured to opposing ends of the filter canister body;
first and second filter cartridges supported within the filter canister body for filtering a as in series, each of the first and second filter cartridges having a filter element supported between respective cartridge end caps;
wherein at least one of the first or second filter cartridges is removable as a unit from the filter canister body; and,
wherein the first canister end cap comprises an inlet end cap including a first aperture and the second canister end cap comprises an outlet end cap including a second aperture.

16. A filter canister is set forth in claim 15, wherein a gas to be filtered flows axially into the canister through the first aperture radially through the first and second filter cartridges and axially out through the second aperture.

17. A filter canister as set forth in claim 15, wherein the first and second filter cartridges are constructed as independent units.

18. A filter canister as set forth in claim 15, wherein the first and second filter cartridges are concentrically arranged with the first filter cartridge at least partially surrounded by the second filter cartridge, and gas is configured to flow through the first filter cartridge and then through the second filter cartridge.

19. A gas-particulate filter canister comprising:
a filter canister body;
first and second canister end caps secured to opposing ends of the filter canister body;
first and second filter cartridges supported within the filter canister body for filtering a gas in series, each of the first and second filter cartridges having a filter element supported between respective cartridge end caps;
wherein at least one of the first or second filter cartridges is removable as a unit from the filter canister body; and,
wherein the second canister end cap comprises radially oriented vanes extending from an inner surface thereof wherein the vanes define a plurality of flow channels.

20. A filter canister as set forth in claim 19, wherein the first and second filter cartridges are constructed as independent units.

\* \* \* \* \*